July 23, 1963   G. ZIEHER   3,098,300
ANGLE MEASURING INSTRUMENT
Filed April 21, 1959   3 Sheets-Sheet 3

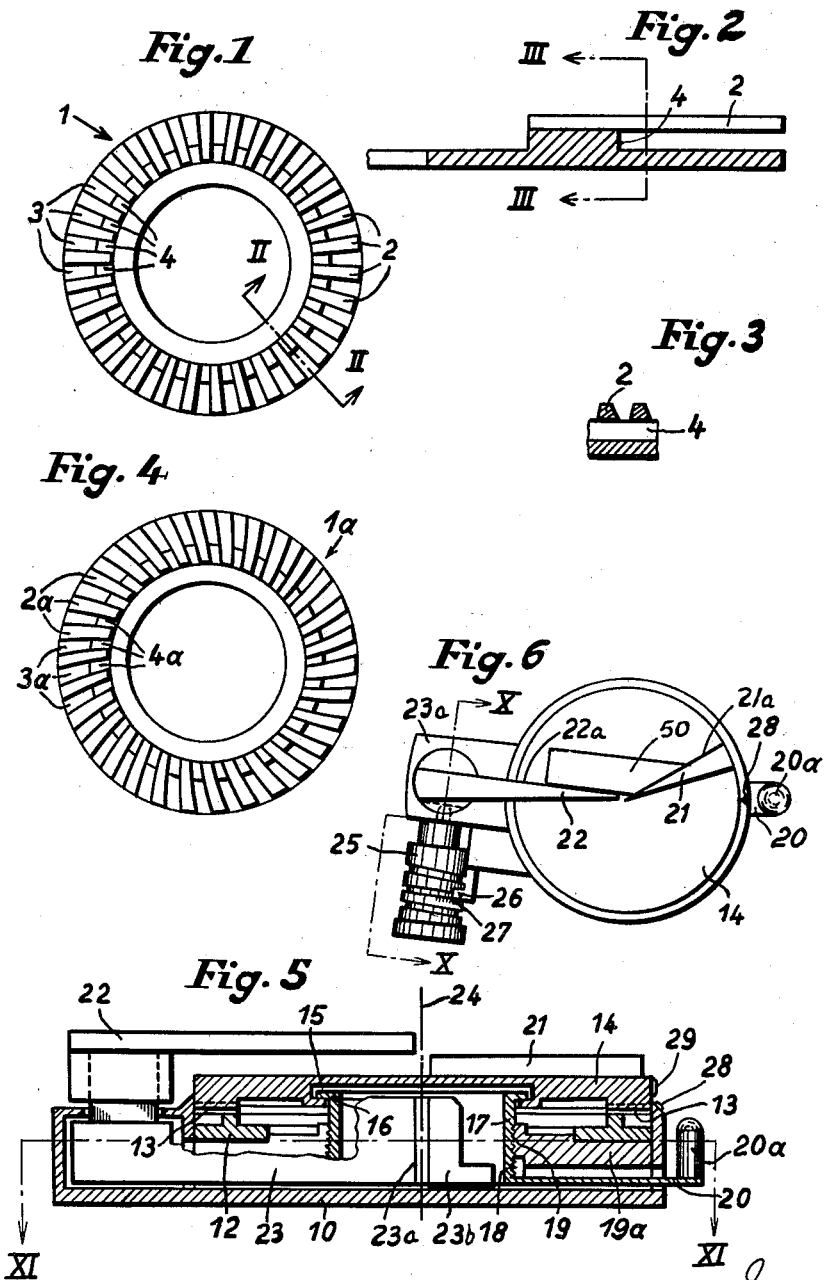

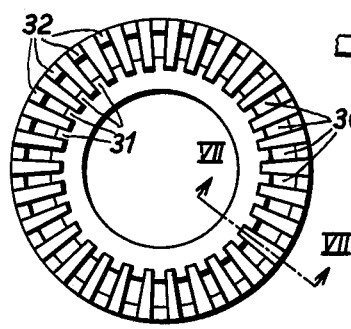
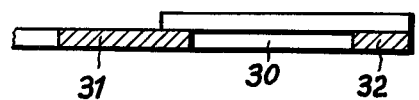
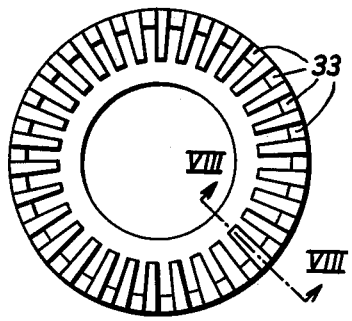
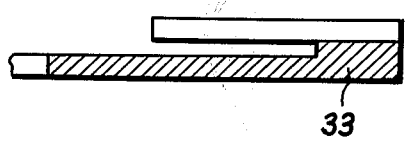
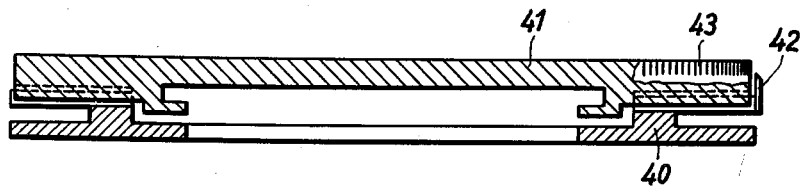

Inventor
Gustav Zieher
By Singer Stern & Carlberg
attys

United States Patent Office 3,098,300
Patented July 23, 1963

3,098,300
ANGLE MEASURING INSTRUMENT
Gustav Zieher, Aalen, Germany, assignor to
Carl Zeiss, Wurttemberg, Germany, a firm
Filed Apr. 21, 1959, Ser. No. 807,943
Claims priority, application Germany Apr. 22, 1958
5 Claims. (Cl. 33—1)

The invention concerns a gear wheel with radial gear teeth and the employment of such a gear wheel in a device for accurately measuring or adjusting the size of an angle.

It is an object of the invention to provide a gear wheel with radial teeth on a plane face of a wheel body in which the wheel body is cut away at the base of the radial teeth and at the bottom of the space between the teeth. This cutting away of the wheel body is produced along at least a portion of the length of the teeth. In such a gear wheel a portion of the length of the teeth, for instance, at the outer ends or at the inner ends or at a portion between the ends of the teeth, will be positioned free in the air. Such an arrangement of the gear teeth gives the same a certain elasticity.

It is also an object of the invention to employ such gear wheels with advantage in machines and devices which serve the purpose of accurately adjusting an angle of rotation or permit the accurate reading of an angle of rotation.

Another object of the invention is to employ such a gear wheel for the purpose of engaging and disengaging it with a second gear wheel of the same type and to provide means which permit that both gear wheels may be selectively rotated with respect to one another at any desired time. It, therefore, is possible when one of the gear wheels is rotated relatively to the other to advance, for instance, a workpiece which is connected with one of the gear wheels, whereby this advance movement can take place about angles of a size equal to the distance between two teeth. Such an angular movement has the advantage that it may be accomplished very accurately compared to other well known devices serving the same purpose.

Heretofore the movement in angular direction was accomplished in such a manner that the part to be rotated was connected with a ring gear which in turn was operatively connected with a drive spindle or a gearing. The angular adjustment, however, was extremely inaccurate, because it was impossible to produce gears with the required accuracy so that during the rotation of the gears it was inevitable that transmission errors were produced which resulted in adjustment errors.

It is also an object of the invention to overcome this disadvantage of the known devices by employing for the advancing movement the above mentioned gear wheels in which the gear teeth have the mentioned elasticity.

It has been proposed heretofore to advance or to adjust a workpiece or the like about critical angular intervals by means of two gear wheels which are adapted to be coupled with one another. Heretofore, however, there have been employed always rigid or, in other words, nonelastic teeth on these gear wheels. It should be obvious that in such a known arrangement the incorrect position of one of these rigid teeth will result in a lateral pressure upon a tooth on the other gear wheel and this results in an incorrect rotative position.

In a device for measuring the size of angles which is equipped with gear wheels in accordance with the present invention and which device is to be used for measuring relatively large angular intervals or which is used also for the adjustment of predetermined crude rotative angles, it is advisable to provide one gear wheel with an indicator and the other gear wheel with an angular graduated scale.

When in the foregoing the term "crude" is used, this term does not indicate that the angular rotation is incorrect but rather this term in intended to indicate that the angular intervals determined by a number of teeth can no longer be subdivided and are measured substantially in the magnitude of degrees.

If it is desired to obtain a finer subdivision, for instance for extremely accurate angular measurements, then the invention may be employed with particular advantage when in a further development of the measuring device one gear wheel is provided with one leg of a pair of measuring jaws which leg is relatively adjustable with reference to a second fixedly mounted gear wheel about individual tooth intervals. The other leg of the pair of measuring jaws or the second gear wheel is then made adjustable by means of a micrometer device, a worm gear, or the like. Both rotative adjustments added together will then give accurately the size of the angle.

With these and other objects in view, the invention will now be described in the following specification with reference to the accompanying drawings which illustrate various embodiments of the invention.

In the drawings:

FIG. 1 is a top plan view of a gear wheel constructed in accordance with the invention.

FIG. 2 is a sectional view along the line II—II of FIG. 1.

FIG. 3 is a sectional view along the line III—III of FIG. 2.

FIG. 4 is a top plan view of a modified gear wheel in which the teeth are produced by means of a self-generating method.

FIG. 5 is a sectional view of an angle measuring machine constructed in accordance with the invention.

FIG. 6 is a top plan view of the device according to FIG. 5.

FIG. 7 is a top plan view of another modified gear wheel.

FIG. 7a is a sectional view along the line VII—VII of FIG. 7.

FIG. 8 is a top plan view of still another modified gear wheel.

FIG. 8a is a sectional view along the line VIII—VIII if FIG. 8.

FIG. 9 is a sectional view of two gear wheels which are arranged in engagement with one another.

Figure 11:
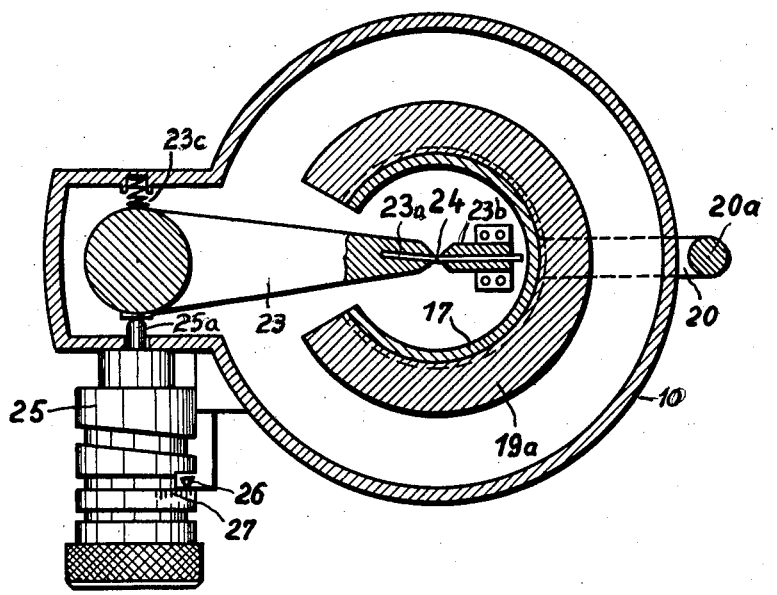
FIG. 11 is a section along the line XI—XI of FIG. 5.

Referring to FIGS. 1 to 3 the circular plate-like body of the gear wheel 1 is provided on one of its plane faces with radial teeth 2 to form a crown gear. The bottoms of the spaces 3 between the teeth 2 and also the body of the gear wheel 1 at the base of the radial teeth 2 is cut away along a portion of the radial length of the teeth 2 so that the teeth 2 are only held together by a flat annular portion 4 of the plane face of the wheel body.

According to FIG. 4, the radial teeth 2a of the gear wheel 1a are slightly curved, because they are produced by a self-generating method. In this modification of the invention the body of the gear wheel at the base of the radial teeth 2a and at the bottom of the spaces 3a between these teeth is cut away so that the radial teeth 2a are solely held together by the annular portion 4a of the wheel body.

It will be noted that in the embodiment of the invention as illustrated in the FIGS. 1 to 4 respectively, the wheel body is cut away always inwardly from the outer circumference and that the cut extends along the base of the teeth.

Referring to the FIGS. 7 and 7a, it will be noted that in this embodiment of the invention the wheel body is cut away along an annular zone 30 positioned radially spaced from the outer circumference of the wheel body. Accordingly, the gear teeth, contrary to the embodiment shown in FIG. 1, are connected with each other at both ends by means of radially spaced annular portions 31 and 32 of the wheel body.

The FIGS. 8 and 8a show still another embodiment of the invention, in which the gear teeth are solely connected with each other by means of an annular portion 33 of the wheel body arranged at the outer circumferential edge of the wheel body.

According to FIG. 9, two gear wheels 40 and 41 are constructed in accordance with the invention and employed for permitting an accurate adjustment of an angle. The gear wheel 40 carries on its outer circumference an indicator 42 and the gear wheel 41 has applied thereto a graduated scale 43. The gear wheel 41 is adapted to be raised to become disengaged from the gear 40 and then may be rotated relatively to the latter. The size of the angle of rotation can then be determined by reading the graduated scale 43.

Figure 10:
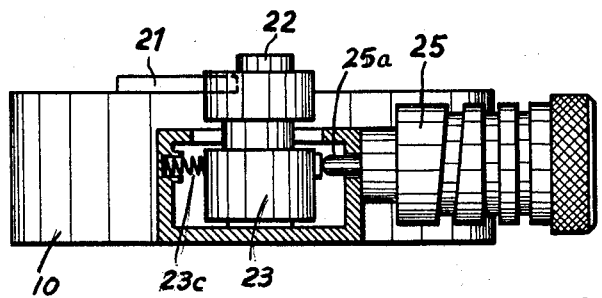
FIG. 10 is a section along the line X—X of FIG. 6.

The FIGS. 5, 6, 10, and 11 illustrate an angle measuring device employing the gear wheels of the present invention. A recessed base member 10 has fixedly mounted therein in a horizontal position a gear wheel 12 having radial elastic gear teeth 13 on its upper plane face. Another horizontally positioned gear wheel 14 with rigid gear teeth on its plane lower face is mounted rotatably about a vertical axis and above the gear wheel 12. As shown in FIG. 5, the teeth of the two gear wheels 12 and 14 are in engagement with each other. The body of the gear wheel 14 is provided in its lower face with a centrally located circular recess, the circular wall of which has cut therein an annular groove 15 into which projects a flange 16 on the upper end of a vertical tubular shaft 17. The shaft 17 is adjustable in vertical direction so that the gear wheel 14 can be raised and thereby brought out of engagement with the gear wheel 12. When the gear wheel 14 has been raised out of engagement with the gear wheel 12 it may be rotated about its vertical axis by hand. For the purpose of vertical adjustment the tubular shaft 17 is provided with an exterior thread 18 engaging an interior thread 19 provided in a stationary wall portion 19a arranged within the recessed base member 10. A horizontal lever arm 20 extends outwardly from the lower end of the vertical tubular shaft 17 and projects through a slot in the base member 10 outwardly therefrom and is provided at its outermost end with an operating handle 20a. Upon lateral movement of the lever arm 20 in a horizontal plane the shaft 17, owing to its threaded engagement with the thread 19, is caused to move in a vertical direction.

The upper horizontal face of the gear wheel 14 has mounted thereon a member 21 provided with a radially extending vertical surface 21a. Another abutment member 22 with a radially extending vertical abutment surface 22a is secured outside the periphery of the gear wheel 14 to an arm 23 which extends inwardly below the fixed gear wheel 12 and has its inner end secured by means of a leaf spring 23a to a post 23b which, in turn, is secured to the base 10. Through this arrangement the arm 23 is rotatable to a degree about the axis 24 of the gear wheels 12, 14. The arm 23 is urged in the counterclockwise direction, FIG. 11, by a compression spring 23c inserted between the base 10 and the outer end of the arm 23, as shown. At the opposite side of the arm 23 it is in engagement with the movable member 25a of a micrometer 25 secured to the base 10.

The indicator 26 of the micrometer 25 is arranged to point to a graduated scale 27 which indicates the size of the angle of rotative adjustment of the abutment means 22. Another indicator 28 on the base 10 points to a graduated scale 29 provided on the outer circumference of the gear wheel 14 and indicates the rotative position or angular adjustment of this gear wheel 14. Both angles when added together give the desired end value.

The instrument may be used for accurately measuring an angle of a workpiece 50, FIG. 6, such as a glass prism. In performing such an operation, the workpiece 50 is placed on the upper surface of the gear wheel 14 with one of the edges enclosing the angle to be measured in engagement with the abutment surface of the member 22, as shown. The handle 20a is then operated to raise the gear wheel 14 out of mesh with the gear wheel 12 and the gear wheel 14 is rotated until the abutment surface of the member 21 is approaching parallelism with the other workpiece surface enclosing the angle to be measured.

By means of the handle 20a the gear wheel 14 is then lowered into meshing engagement with the gear wheel 12 and the micrometer 25 is operated until the workpiece is in complete engagement with the abutment surface of member 21. The readings on the two scales 29, 27 are then added, with observance of their correct signs (plus or minus).

It is obvious that the instrument may be similarly used for marking an angle to be cut or machined on a workpiece, and in either case a high degree of accuracy is achievable through simple operations.

What I claim is:

1. In an angle measuring instrument, means defining a supporting base, first gear means secured to said base in horizontal position having a plane upper side provided with an annular series of substantially radially extending teeth thereon, second gear means disposed concentrically above said first gear means and having a plane lower side provided with an annular series of teeth thereon adapted to mesh with the teeth of said first gear means, at least one of said gear means having a horizontal circular undercut removing a portion of the bottom walls of the horizontal radial grooves formed between said radial teeth so as to render the undercut gear teeth flexible, and means including threadedly engaged members arranged within said supporting base connected with said second gear means for raising it out of mesh with said first gear means to a position where it is freely rotative about its axis.

2. An angle measuring instrument as set forth in claim 1, including means defining a first abutment surface extending upwardly and in radial direction on the upper side of said second gear means, means defining a second abutment surface extending radially inwards from a point outside the periphery of said second gear means, an arm extending radially outwards from the axis of the gear means to a point outside the periphery of said second gear means below said first gear means, connecting means securing said arm to said second abutment means, means securing said arm to said base so as to permit a degree of rotation of said arm about the axis of said gear means, and adjustment means secured to said base and operatively connected with said arm to enable the angular position of said arm to be precision adjusted by rotation about said axis.

3. An angle measuring instrument as set forth in claim 2, including scale and indicator means associated with said adjustment means to permit visual determination of the angular position of said arm and second abutment means.

4. An angle measuring precision instrument, comprising means defining a supporting base, first gear means secured to said base in horizontal position and provided on its upper side with an annular series of substantially radially extending teeth, second gear means disposed concentrically above said first gear means and provided on its lower side with an annular series of teeth adapted to mesh with the teeth of said first gear means, at least one of said annular series of teeth comprising undercut teeth having a degree of flexibility, means connected with said second gear means for raising it out of mesh with said first gear means to a position where it is freely rotative about its axis, scale means indicating angular values on said second gear means, indicator means on said supporting base for cooperation with said scale means to enable determination of the angular position of said second gear means relative to said first gear means, means defining a first abutment surface extending upwardly and in radial direction on the upper side of said second gear means, means defining a second abutment surface extending radially inwards from a point outside the periphery of said second gear means, an arm extending radially outwards from the common axis of said two gear means to a point outside the periphery of said second gear means below said first gear means, connecting means securing said arm to said second abutment means, means securing said arm to said base so as to permit a degree of rotation of said arm about the axis of said gear means, adjustment means operatively interconnecting said base and second abutment means to enable precision adjustment of said second abutment means about said axis, and scale and indicator means associated with said adjustment means to permit visual determination of the angular position of said arm and second abutment means, whereby the angle between said first and second abutment surfaces may be accurately set and readily determined by reading said two scale and indicator means.

5. A crown gear comprising a circular plate-like body member having a plane face, and an annular series of substantially radial teeth on said plane face, said teeth being undercut along the middle portion of their radial length to provide a measure of flexibility of said teeth.

References Cited in the file of this patent

UNITED STATES PATENTS

| | | |
|---|---|---|
| 1,737,002 | Devlieg | Nov. 26, 1929 |
| 2,366,079 | Wilson | Dec. 26, 1944 |
| 2,663,082 | Bauersfeld | Dec. 22, 1953 |
| 2,764,034 | Hotins | Sept. 25, 1956 |
| 2,921,487 | Schabot | Jan. 19, 1960 |

FOREIGN PATENTS

| | | |
|---|---|---|
| 166,403 | Australia | Dec. 29, 1955 |